United States Patent [19]
Wenger et al.

[11] Patent Number: 4,675,202
[45] Date of Patent: Jun. 23, 1987

[54] PROCESSING OF EGG YOLK

[75] Inventors: Ulrich Wenger, Grosshöchstetten, Switzerland; Tatsuya Horiuchi, Kobe, Japan

[73] Assignee: Nestec S.A., Vevey, Switzerland

[21] Appl. No.: 786,951

[22] Filed: Oct. 10, 1985

[30] Foreign Application Priority Data

Nov. 2, 1984 [EP] European Pat. Off. ........ 84113203.8

[51] Int. Cl.$^4$ ........................... A23L 1/32; A23L 3/00
[52] U.S. Cl. ..................................... 426/614; 426/521
[58] Field of Search ........................ 426/614, 521, 568

[56] References Cited

U.S. PATENT DOCUMENTS 1,996,801 4/1935 Fischer ................................ 426/614
2,910,366 10/1959 Leo et al. ........................ 426/614 X
3,212,906 10/1965 Jones ................................. 426/614 X
3,579,631 5/1971 Stewart, Jr. et al. ........... 426/521 X
4,333,959 6/1982 Bracco et al. ....................... 426/614

OTHER PUBLICATIONS

Stadelman, W. J., et al., "Egg Science and Technology", Avi. Publ. Co., Inc., Westport, Conn., 1977, pp. 170 and 171.

Primary Examiner—Robert Yoncoskie
Attorney, Agent, or Firm—Vogt & O'Donnell

[57] ABSTRACT

A process for sterilizing egg yolk wherein an aqueous slurry of egg yolk is acidified to a pH of less than 6.0 and then sterilized under ultra high temperature processing conditions. There is also disclosed a process for preparing sterilized food products containing said sterilized egg yolk.

14 Claims, No Drawings

PROCESSING OF EGG YOLK

The present invention relates to the processing of egg yolk, more particularly to a process of treating egg yolk to avoid thermal coagulation.

Egg yolk is a heat-sensitive material in which the protein begins to coagulate at 65° C. and it is therefore very difficult to incorporate egg yolk into products which have to be sterilised.

We have now found, surprisingly, that if the pH of the egg yolk is reduced to less than 6.0 then the egg yolk can be sterilised under ultra high temperature processing conditions without substantial coagulation.

Accordingly the present invention provides a process for sterilising egg yolk characterised in that an aqueous slurry of egg yolk is acidified to a pH of less than 6.0 and then sterilised under ultra high temperature processing conditions.

The egg yolk used may conveniently be diluted with the water at ambient temperature. If frozen egg yolk is used it is desirably thawed completely before diluting with the water, for example by rapid thawing at 50° C. to 60° C. or slow thawing at about 4° C.

The egg yolk is suitably mixed with the water by an agitator which minimises foam formation or by a hand stirrer. After mixing, the aqueous slurry may, if desired be mixed in a colloid mill or homogenised, for instance, at a pressure from 10 to 250 bars, preferably from 25 to 100 bars, at ambient temperature.

The amount of egg yolk present in the aqueous slurry may be from 5% to 50%, preferably from 10% to 40% and especially from 15% to 25% by weight based on the weight of the slurry.

If desired, there may be added to the egg yolk before or after mixing with water other substances such as egg-white, fat or carbohydrates, such as sugar.

The acidification of the aqueous slurry of egg yolk may be carried out by any suitable method, for instance by mixing with any food-acceptable acid or a food substance capable of lowering the pH. Phosphoric acid is especially suitable since it produces no gas formation but other acids may be used, for example, a strong mineral acid such as hydrochloric acid or organic acids such as citric, tartaric or lactic acid. The amount of acid added to the egg yolk may conveniently be sufficient to acidify the egg yolk slurry to the desired pH. The concentration of the acid used depends inversely on its strength. Preferably, the acidification of the aqueous slurry of egg yolk is carried out at a temperature below 10° C., for example from 2.5° C. to 7.5° C.

The pH of the acidified slurry is conveniently from 2.0 to 5.7, preferably from 3.0 to 5.5 and especially from 4.0 to 5.0.

By ultra high temperature processing conditions we mean heating at temperatures from 128° C. to 155° C., for a period of time from 50 seconds to 1 second. The temperature is preferably from 140° C. to 150° C. and the time is preferably from 20 seconds to 3 seconds and especially from 15 seconds to 5 seconds. The conditions are chosen so that they are sufficient to sterilise the egg yolk but insufficient to cause substantial coagulation. The sterilising treatment may be carried out directly, for example, by direct steam injection, or indirectly, for example, by using plate or tubular or scraped surface heat exchangers.

The direct ultra high temperature processing step is advantageously preceded by a preheating step to a temperature, for example, from 65° C. to 90° C., and then followed by a rapid cooling step to a temperature, again for example, from 65° C. to 90° C. before cooling to ambient temperature.

By the use of the process of this invention an ultra high temperature sterilised food product containing egg yolk may be prepared without substantial coagulation of the egg yolk. One method of preparing such a product comprises sterilising the egg yolk by the process according to this invention and separately sterilising a food material preferably under ultra high temperature processing conditions and then mixing with the sterilised egg yolk, for instance, in a sterile container at a temperature below about 65° C.

The sterilised mixture of egg yolk and food material is conveniently aseptically filled into presterilised containers.

The process of this invention may be used for making a variety of sterilised food products containing egg yolk, for example, custard, dessert cream, pudding, creams for bakery products and culinary products. The amount of egg yolk in the final product is generally from 0.5% to 15% by weight and preferably from 1 to 10% by weight based on the total weight of the product depending upon the requirements.

The desired pH of the final product may be higher than that of the acidified ultra high temperature sterilised egg yolk aseptically mixed with the separately sterilised food material and the appropriate adjustment may be made by adding a suitable alkali, for example, $Na_3PO_4.12H_2O$. The alkali is conveniently added to the unsterilised food product.

In the case of a custard, the acidified egg yolk slurry is desirably added slowly to the milk phase with stirring to avoid coagulation of the milk proteins.

The following Examples further illustrate the present invention.

EXAMPLE 1

Frozen egg yolk having a solids content of 44%, was thawed at 20° C. and diluted with ordinary tap water to give a mixture containing 20% by weight egg yolk based on the total weight of the mixture. The mixture was stirred by an agitator and then homogenised under a pressure of 50 bars at 20° C. The homogenised aqueous egg yolk slurry having a pH of 7.3 was cooled to 5° C. and acidified to pH 4.5 with 0.29% by weight of 85% phosphoric acid. The acidified egg yolk slurry was preheated by a plate heater to 80° C. then sterilised at 145° C. for 15 seconds by steam injection, flash cooled to 80° C. and then cooled by a plate heater to 20° C. The sterilised egg yolk showed no coagulation.

EXAMPLE 2

By carrying out a similar procedure to that described in Example 1 but acidifying the homogenised aqueous egg slurry to pH 5.5 with 0.14% by weight of 85% phosphoric acid, there was no coagulation after sterilisation.

EXAMPLE 3

By carrying out a similar procedure to that described in Example 1 but acidifying the homogenised aqueous egg slurry to pH 5.0 with 0.20% by weight of 85% phosphoric acid, there was no coagulation after sterilisation.

EXAMPLE 4

By carrying out a similar procedure to that described in Example 1 but acidifying the homogenised aqueous egg slurry to pH 4.0 with 0.40% by weight of 85% phosphoric acid, there was no coagulation after sterilisation.

COMPARATIVE EXAMPLE A

By carrying out a similar procedure to that described in Example 1 but acidifying the homogenised aqueous egg slurry only to pH 6.0 with 0.09% by weight of 85% phosphoric acid, coagulation occurred on sterilisation.

COMPARATIVE EXAMPLE B

By carrying out a similar procedure to that described in Example 1 but without acidification, coagulation occurred on sterilisation.

EXAMPLE 5

75 parts of a milk phase whose pH had been adjusted to 7.11 by the addition of $Na_3PO_4.12H_2O$ was prepared having the following constitution in parts by weight:
Milk fat ex cream: 5.0
SNF ex MSK and cream: 7.0
Sucrose: 12.0
Starch: 3.0
Maltodextrin: 1.0
NaCl: 0.03
Flavour: 0.24
Colour: 0.004
$Na_2HPO_4.2H_2O$: 0.02
$Na_3PO_4.12H_2O$: 0.166
water: 46.54

This milk phase was preheated by a plate heater to 80° C., sterilised at 145° C. for 15 seconds by steam injection, flash cooled to 80° C. and then cooled by a plate heater to 20° C. The pH had increased to 7.20. 25 parts of the separately ultra high temperature sterilised aqueous egg yolk slurry prepared as in Example 1 was added slowly with stirring to the sterilised aqueous milk phase in a sterile tank and the mixture whose pH was 6.67 was aseptically filled into plastic caps. The custard cream product showed no coagulation.

COMPARATIVE EXAMPLE C

By carrying out a similar procedure to that described in Example 5 but using a homogenised aqueous egg yolk slurry acidified only to pH 6 as described in Comparative Example A, the custard cream product showed coagulation.

We claim:

1. A process for sterilising egg yolk comprising acidifying an aqueous slurry of egg yolk, wherein the amount of egg yolk in the aqueous slurry is from 5% to 50% by weight based on the weight of the slurry, to a pH of from 2.0 to 5.7 and then heating the acidified aqueous slurry to a temperature from 128° C. to 155° C. for a time sufficient to sterilise the egg yolk.

2. A process according to claim 1 wherein the aqueous slurry of the egg yolk is prepared by mixing the egg yolk with water and homogenising.

3. A process according to claim 1 wherein the amount of egg yolk in the aqueous slurry is from 15% to 25% by weight based on the weight of the slurry.

4. A process according to claim 1 wherein the acidification of the aqueous slurry of egg yolk is carried out by means of phosphoric acid.

5. A process according to claim 1 wherein the pH of the acidified slurry is from 3.0 to 5.5.

6. A process according to claim 1 wherein the pH of the acidified slurry is from 4.0 to 5.0.

7. A process according to claim 1 wherein the slurry is heated to 140° C. to 150° C. for from 20 seconds to 3 seconds.

8. A process according to claim 1 further comprising mixing the sterilised egg yolk with a sterilised food material.

9. A process according to claim 8 wherein the mixture is a custard cream.

10. A process according to claim 1 wherein the amount of egg yolk in the aqueous slurry is from 10% to 40% by weight baed on the weight of the slurry.

11. A process according to claim 1 wherein the slurry is heated to 140° C. to 150° C. for from 15 seconds to 5 seconds.

12. A process according to claim 1 wherein the slurry is heated to 128° C. to 155° C. from 50 seconds to 1 second.

13. A process according to claim 1 further comprising preheating the acidified slurry to 65° C. to 90° C., then sterilising, and then rapidly cooling the sterilised slurry to 65° C. to 90° C. and then cooling to ambient temperature.

14. A process according to claim 1 or 12 wherein the acidification is carried out at a temperature below 10° C.

* * * * *

UNITED STATES PATENT AND TRADEMARK OFFICE
CERTIFICATE OF CORRECTION

PATENT NO. : 4,675,202

DATED : June 23, 1987

INVENTOR(S) : Ulrich Wenger, et al.

It is certified that error appears in the above-identified patent and that said Letters Patent is hereby corrected as shown below:

Claim 10, column 4, line 34, "baed" should be --based--.

Signed and Sealed this

Thirteenth Day of October, 1987

Attest:

DONALD J. QUIGG

Attesting Officer

Commissioner of Patents and Trademarks